(12) United States Patent
Daskalov et al.

(10) Patent No.: US 9,236,056 B1
(45) Date of Patent: Jan. 12, 2016

(54) VARIABLE LENGTH LOCAL SENSITIVITY HASH INDEX

(71) Applicant: Google Inc., Mountain View, CA (US)

(72) Inventors: Boris Nikolaev Daskalov, Sofia (BG); Gheorghe Postelnicu, Zürich (CH)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 13/966,200

(22) Filed: Aug. 13, 2013

(51) Int. Cl.
  *G06F 17/00* (2006.01)
  *G10L 19/018* (2013.01)
(52) U.S. Cl.
  CPC ..................................... *G10L 19/018* (2013.01)
(58) Field of Classification Search
  CPC ............ G06K 9/00758; G06F 17/3033; G06F 17/30743; G10L 25/54
  See application file for complete search history.

(56) References Cited

U.S. PATENT DOCUMENTS

| | | | |
|---|---|---|---|
| 8,069,176 B1 * | 11/2011 | Ioffe et al. ..................... | 707/747 |
| 8,392,427 B1 * | 3/2013 | Ioffe et al. ..................... | 707/747 |
| 2009/0052784 A1 * | 2/2009 | Covell et al. .................. | 382/209 |
| 2010/0138456 A1 * | 6/2010 | Aghili ........................... | 707/803 |
| 2013/0046767 A1 * | 2/2013 | Lee et al. ...................... | 707/747 |
| 2014/0019390 A1 * | 1/2014 | Glennon et al. ................ | 706/12 |

OTHER PUBLICATIONS

Covell, M., et al., "Known-Audio Detection Using Waveprint: Spectrogram Fingerprinting by Wavelet Hashing," 4 pages, Apr. 15-20, 2007.

* cited by examiner

*Primary Examiner* — Andrew C Flanders
(74) *Attorney, Agent, or Firm* — Fenwick & West LLP

(57) ABSTRACT

Implementations are provided herein relating to audio matching. A variable length local sensitivity hash ("LSH") index can be created through a careful examination of existing LSH bands in the LSH index. LSH bands with offset lists that meet a band size threshold can be lengthened repeatedly until a maximum length threshold is reached or an offset list associated with a lengthened LSH band fails to meet the band size threshold. The LSH index can be further tuned by downsampling or discarding LSH bands that reach a maximum length threshold and still lack discriminate properties.

21 Claims, 10 Drawing Sheets

VARIABLE LENGTH LOCAL SENSITIVITY HASH INDEX

TECHNICAL FIELD

This application relates to matching of audio content and video content and more particularly to using a variable length local sensitivity hash lookup index.

BACKGROUND

Audio matching provides for identification of a recorded audio sample (e.g., an audio track of a video) by comparing the audio sample to a set of reference samples. To make the comparison, an audio sample can be transformed to a time-frequency representation (e.g., by employing a short time Fourier transform). Using a time-frequency representation, interest points that characterize time and frequency locations of peaks or other distinct patterns of a spectrogram can be extracted from the audio sample. Fingerprints can be computed as functions of sets of interest points. Fingerprints of the audio sample can then be compared to fingerprints of reference samples to determine identity of the audio sample. Fingerprints of reference samples can be stored within a reference index in a format that provides for efficient matching of audio sample fingerprints with reference index data.

In a typical descriptor audio matching system, a reference index maps locality sensitive hash ("LSH") bands representing content within the reference index. For example, a fingerprint represented as a vector of strings can be divided into subfingerprints or single strings of the vector. LSH bands can then be built by concatenating several low-entropy locality sensitive hashes from an individual subfingerprint into an LSH band. However, some LSH bands within a reference index are more common than others. A list of offsets can be generated for LSH bands in the reference index where the list of offsets delineates reference samples or multiple parts of the same reference sample that share the same LSH band.

When an LSH band in an audio sample matches an LSH band in a reference index, additional matching processing can occur that can compare the audio sample and the reference index in a more in depth manner. However, if a large amount of reference LSH bands are identical, e.g., the list of offsets is highly populated, the computing and memory resources necessary to process additional potential matches can decrease matching efficiency. In addition, common LSH bands with a large list of offsets may to be too indiscriminate to be useful in successfully matching an audio sample.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, an LSH band component generates a set of local sensitivity hash ("LSH") bands based on a set of subfingerprint strings and minimum efficiency length. An offset component determines an offset list associated with LSH bands in the set of LSH bands. A splitting component lengthens LSH bands in the set of LSH bands by an additional byte based on the offset list and a band size threshold in response to determining the offset list associated with an LSH band meets the band size threshold.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

DETAILED DESCRIPTION

Figure 1:
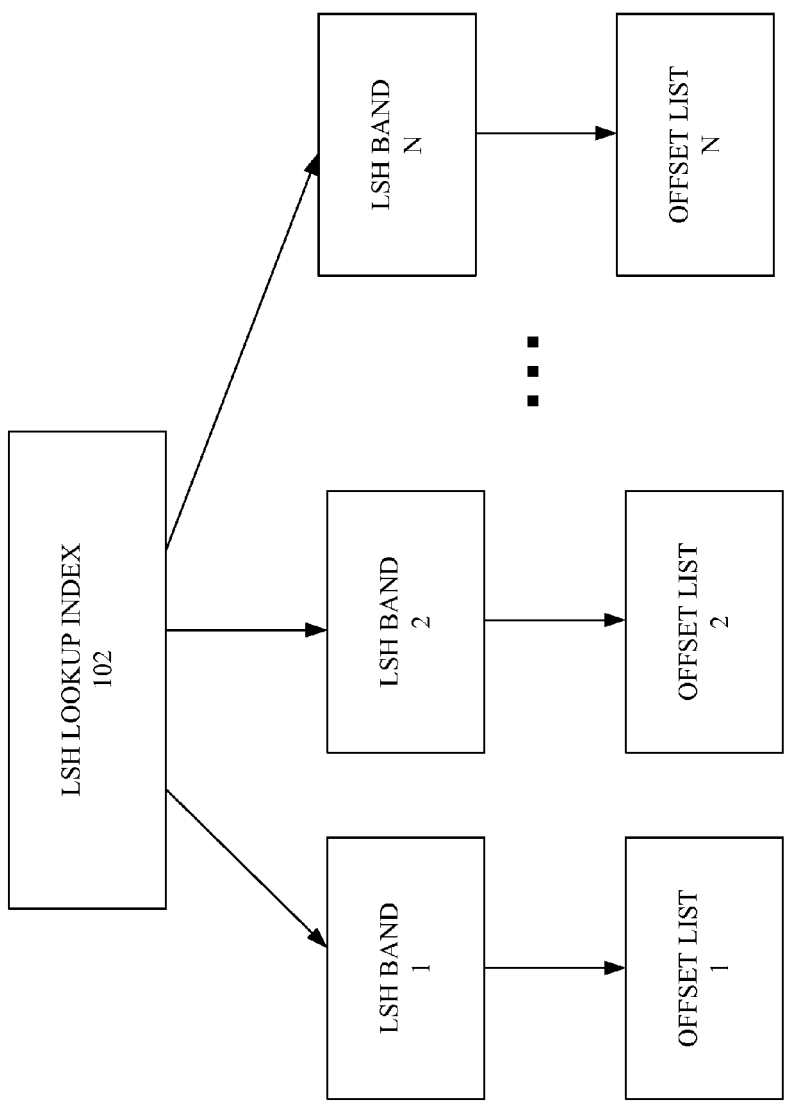
FIG. 1 illustrates an example block diagram representing an LSH lookup index.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. As a starting point for this analysis, a spectrogram of the audio signal is constructed; the spectrogram represents an audio sample by plotting time on one axis and frequency on another axis. Amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at a specific frequency over time. The audio sample can be run through additional filters to individually isolate a set of frequencies to measure amplitude of the set over time. A spectrogram can be created by combining respective measurements over time on a frequency axis to generate a spectrogram image of frequency amplitudes over time.

A second technique involves using a short-time Fourier transform ("STFT") to break down an audio sample into time windows, where respective windows are Fourier transformed to calculate magnitude of a frequency spectrum for the duration of each window. Combining a plurality of windows side by side on a time axis of the spectrogram creates an image of frequency amplitudes over time. Other techniques, such as wavelet transforms, can also be employed to construct a spectrogram.

Interest points that characterize time and frequency locations of peaks or other distinct patterns of a spectrogram can be extracted from the audio sample. Fingerprints can be computed as functions of sets of interest points. Fingerprints of the audio sample can then be compared to fingerprints of reference samples to determine the identity of the audio sample. Fingerprints of reference samples can be stored within a reference index in a format that provides for efficient matching of audio sample fingerprints with reference index data.

A reference index can map locality sensitive hash ("LSH") bands representing the content within the reference index. For example, a fingerprint represented as a vector of strings can be divided into subfingerprints or single strings of the vector. LSH bands can then be built by concatenating several low-entropy locality sensitive hashes from an individual subfingerprint into an LSH band. For example, LSH bands can include a fixed number of bytes taken sequentially from each subfingerprint. Continuing this example, if each subfingerprint string is a length of 100 bytes, then LSH bands can be built by selecting a fixed number of bytes sequentially, e.g., the byte values at positions [0, 1, 2, 3]. However, in a large reference index with millions or billions of subfingerprints, some LSH bands may occur in not only more than one subfingerprint but in many subfingerprints. In matching an LSH band related to an unidentified audio sample, if thousands or millions of reference samples match that same LSH band, then that LSH band is likely too indiscriminate to be useful in identifying which reference sample that shares the same LSH band is the actual identity of the audio sample.

Referring now to FIG. 1, there is illustrated an example block diagram representing an LSH lookup index 102. LSH Lookup Index 102 comprises a set of LSH bands (e.g., LSH Band 1, LSH Band 2, to LSH Band "N" where N is an integer.) It can be appreciated that in a large lookup index containing LSH bands related to millions of reference samples, the amount of LSH Bands are many. For individual LSH Band 1, an offset list, Offset List 1, is associated with the LSH band. Offset List 1 identifies the reference sample subfingerprints that share the same LSH band, in this example, LSH Band 1. For example, the offset list can provide two levels or layers of information for each item on the list. One level provides the reference within which the value of the LSH band appears, e.g., an individual song or audio sample. A second level provides the offset within the reference where the LSH band appears, e.g., the point in time within the reference sample. Thus, an offset list can contain multiple LSH bands from a single reference with different offsets, e.g., LSH bands of the same value that occur at different times within the same reference sample, as well as LSH bands from different reference samples, e.g., LSH bands of the same value that occur within different reference samples.

In a reference index that consists of a fixed number of bytes for LSH bands, if the number of fixed bytes in each band is too short, some LSH bands will have a highly populated offset list, resulting in inefficient, indiscriminate matching. Alternatively, if the number of fixed bytes in each band is too long, then the LSH bands used in matching may be too discriminative. For example, when someone records audio using a mobile device with background noise or from a radio station that alters the content subtly for transmission, minor differences, such as pitch shift distortions or time stretch distortions, that may not always be apparent to the sensitivities of the human ear, may still prevent the long LSH band of an audio sample from matching the same length LSH band of a reference sample.

Implementations disclosed herein provide for extending the length of LSH bands when they become overpopulated, e.g., when the LSH band occurs in too many references and/or the offset list gets too large. LSH bands can be generated based on a set of subfingerprint strings and a minimum efficiency length. For example, it may be apparent that at least 4 bytes are required to provide at least some discriminate matching, e.g., the minimum efficiency length. Concurrently with or after LSH bands of the minimum efficiency length are generated for the set of subfingerprints, offset lists can be determined for individual LSH bands. A band size threshold can be established where if the offset list associated with an LSH band reaches the band size threshold, it can be indicative that too many reference subfingerprints and/or offsets share that same LSH band and that lengthening that LSH band for each item in the offset list is beneficial in matching more discriminately. Thus, an additional byte, e.g., a $5^{th}$ byte, can be added to the LSH band to lengthen it. It can be appreciated that upon lengthening the LSH band, the previously shared band will be split into many new bands, as the new byte added to each individual band that previously shared the same bytes, will likely have many different values.

This process can be repeated on lengthened LSH bands as well. For example, an offset list can be determined for an LSH band that was previously lengthened to 5 bytes from 4 bytes. It is possible that enough reference subfingerprints and/or offsets share the same 5 byte LSH band that the offset list associated with the 5 byte band meets or exceeds the band size threshold. In this case, the 5 byte LSH band can be lengthened to 6 bytes. In one implementation, a maximum length threshold can be established for LSH bands. For example, some LSH bands may be lengthened to 10 bytes and still have an offset list that meets or exceeds the band size threshold. This likely indicates that this LSH band is still not discriminative enough for matching. Thus, an LSH band that reaches a maximum length threshold and is still not discriminative can in one implementation be discarded from the lookup index, or in another implementation down-sampled.

There are several techniques for selecting bytes of the subfingerprint string to include within the LSH band. Thus, when lengthening an LSH band, it is advantageous to select the additional byte in a similar manner in which the original bytes of the LSH band were selected. In one technique, LSH bands can include consecutive bytes from the subfingerprint string. For example, if a subfingerprint string includes 100 bytes in positions 0 to 99, (e.g., [0, 1, 2, 3, 4, . . . 99]), a group of consecutive bytes from the subfingerprint can be selected. Continuing the example, if the minimum efficiency length is 4 bytes, the bytes at positions [0, 1, 2, 3] can be selected. If it is then determined through an analysis of the offset list associated with that LSH band that it is desirable to lengthen the band, the next consecutive byte, in this example, the byte at the 5th position, can be selected. This would generate a 5 byte sequence of the bytes at positions [0, 1, 2, 3, 4]. It can be appreciated that consecutive bytes do not have to start from position 0. It can also be appreciated that if multiple LSH bands are generated from a single subfingerprint lengthened LSH bands can overlap. For example, two 4 byte LSH bands can be generated from a single subfingerprint, the first LSH band representing bytes at positions [0, 1, 2, 3,] and the second LSH band representing bytes at positions [4, 5, 6, 7,]. If the first LSH band is lengthened, the byte at position 4 can be added to create an LSH band representing bytes at positions [0, 1, 2, 3, 4] while the second LSH band remains unchanged.

In a second technique, random bytes from positions zero through 99 can be selected where the next byte is determined based on a randomizing hash of the previous bytes. For example, the first byte of the band can be at a fixed position, e.g., position 0, and then the second byte can be based on a randomizing hash of the first byte, the third byte can then be based on a randomizing hash of the first and second byte, etc. When selecting random byte positions, it can be appreciated that a record of previous byte positions selected can be known and that if through the randomizing, the same byte is selected again to be added to the LSH band, you can use the randomizing function to select a different byte position that is not yet within the LSH band. It can be further appreciated that varying types of randomizing functions can be used with success in determining the next byte position value to add to the LSH band. One example of a randomizing hash is one that depends on the actual position of the first byte. For example for band i (with i is an integer between 0 and 24), for a fingerprint string "S" can be constructed by concatenating bytes S(4*i . . . (4*(i+1))).". It can be appreciated that this can make the values sampled more random as it depends on the position of the bit and not the actual value of the bit.

It can be appreciated that all the bytes at a given offset and/or at a given reference can be pre-computed for the longest possible LSH band, e.g., generated at the time subfingerprints are generated for individual reference samples. During index generation, the index can start with just the minimum efficiency length for every LSH band, and then as needed, lengthen individual LSH bands without having to reprocess or reread the original audio sample or associated fingerprints.

Figure 2:
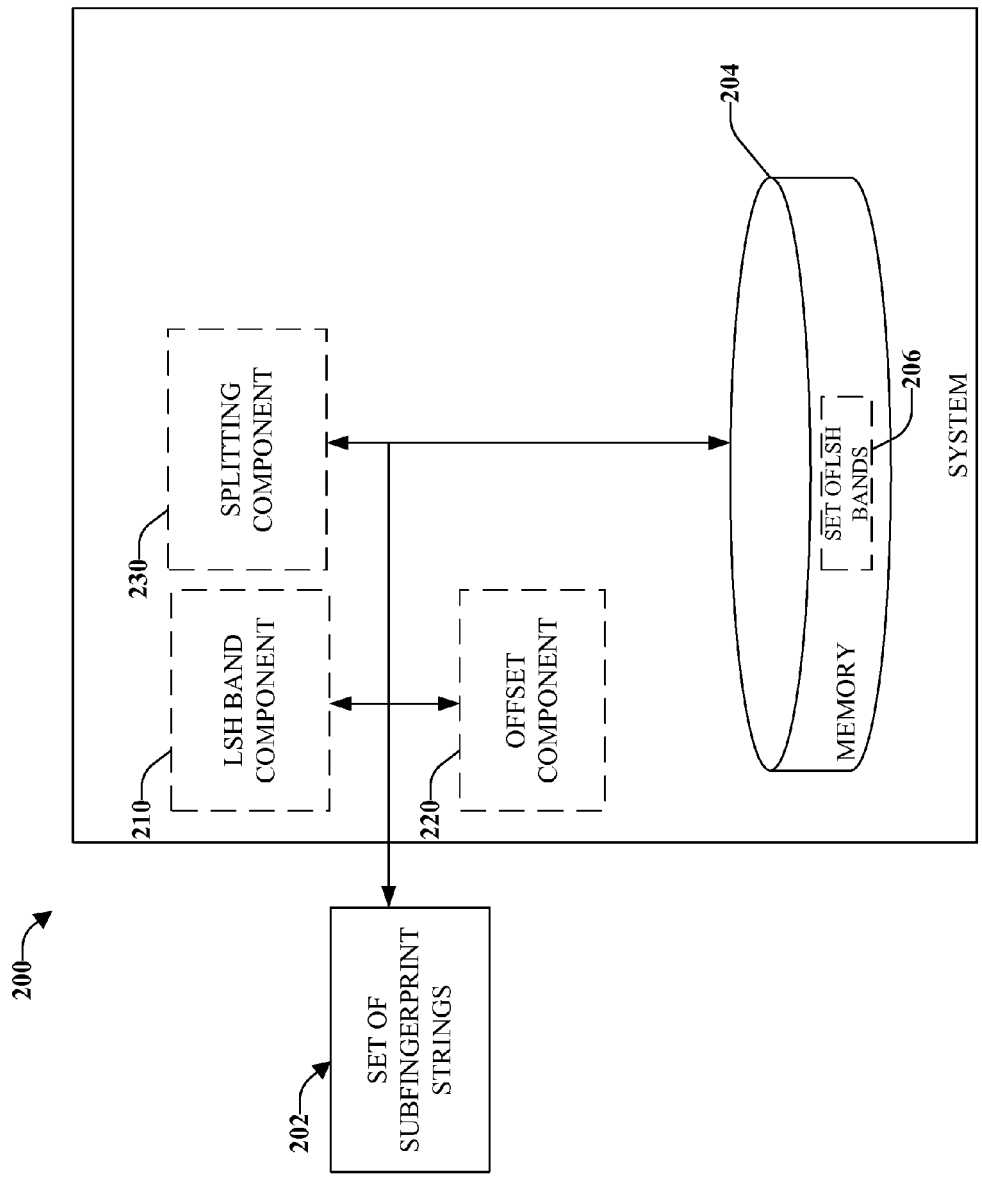
FIG. 2 illustrates a high-level functional block diagram of an example system in accordance with implementations of this disclosure.

Referring now to FIG. 2, there is illustrated a high-level functional block diagram of an example system in accordance with implementations of this disclosure. LSH Band component 210 can generate a set of LSH bands based on a set of subfingerprint strings 202 and a minimum efficiency length. It can be appreciated the length of LSH bands in the set of LSH bands are at least the length of the minimum efficiency length. In one implementation, LSH Band component 210 can generate LSH bands among the set of LSH bands based on concatenating bytes from a subfingerprint string amount the set of fingerprint prints. In one implementation, the concatenated bytes are consecutive bytes from the subfingerprint string. In another implementation, the concatenated bytes comprise a first byte and a set of following bytes wherein a following byte in the set of following bytes is based on a randomizing hash of the first byte and preceding following bytes in the set of following bytes.

Offset component 220 can determine an offset list associated with LSH bands in the set of LSH bands. Splitting component 230 can lengthen LSH bands in the set of LSH bands by an additional byte based on the offset list and a band size threshold in response to determining the offset list associated with an LSH band meets the band size threshold. In one implementation, the additional byte is a next consecutive byte from the subfingerprint string. In another implementation, the additional byte is based on the randomizing hash of the LSH band. In one implementation, the splitting component lengthens LSH bands in the set of LSH bands based on a maximum length threshold. For example, the splitting component can restrain from lengthening LSH bands once the maximum length threshold is reached.

Figure 3:
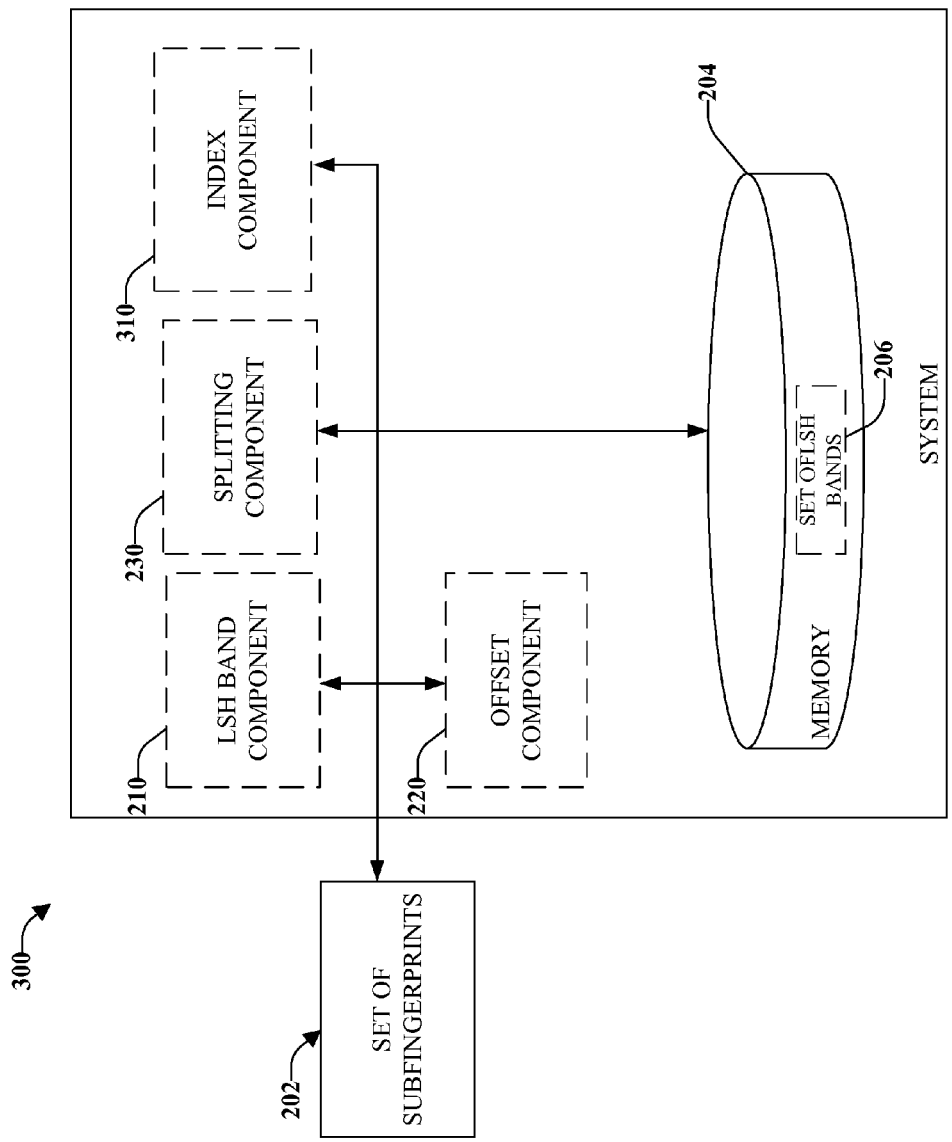
FIG. 3 illustrates a high-level functional block diagram of an example system including an index component in accordance with implementations of this disclosure.

Referring now to FIG. 3, there is illustrated a high-level functional block diagram of an example system including an index component 310 in accordance with implementations of this disclosure. Index component 310 can store the set of LSH bands in a lookup index. For example, the lookup index can be used within an audio matching system to provide for matching LSH bands related to subfingerprints of an audio sample of unknown identity.

Figure 4:
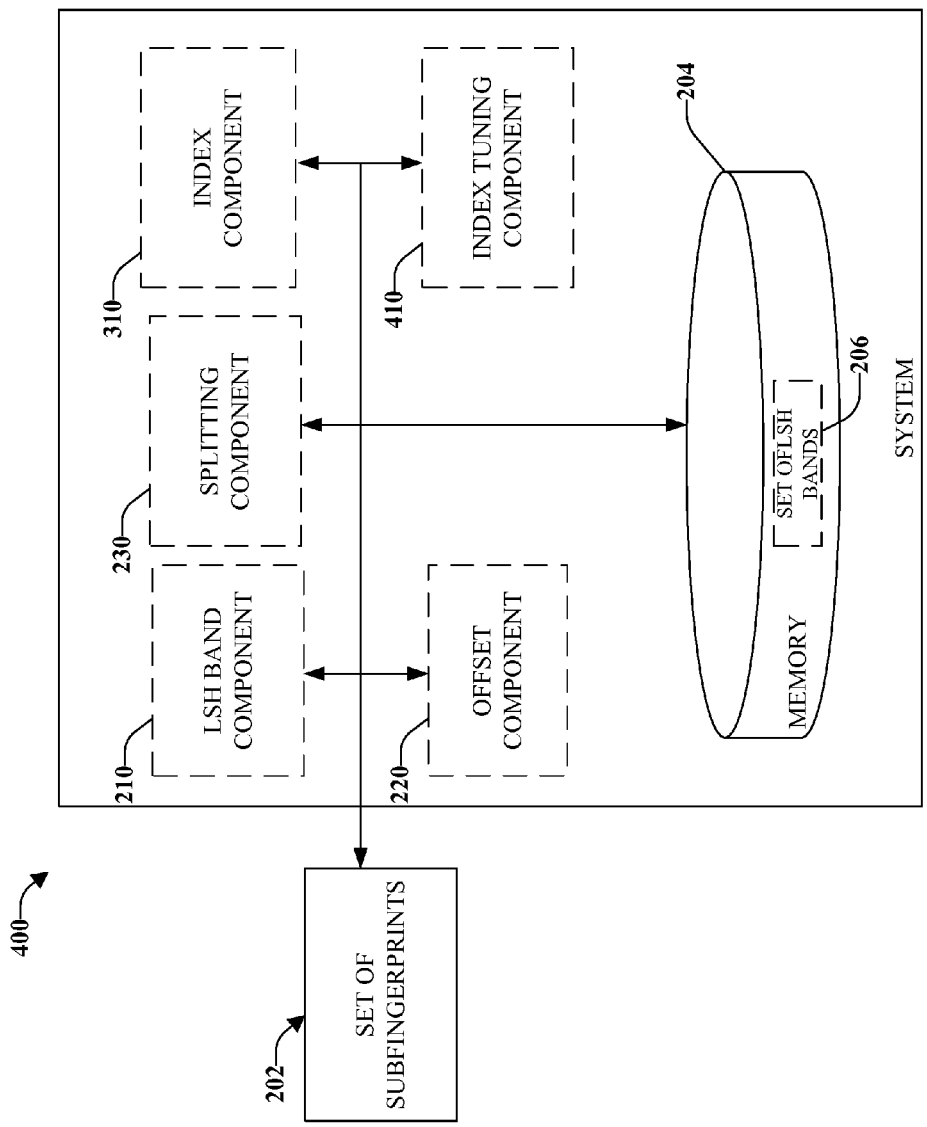
FIG. 4 illustrates a high-level functional block diagram of an example system including an index tuning component in accordance with implementations of this disclosure.

Referring now to FIG. 4, there is illustrated a high-level functional block diagram of an example system including an index tuning component 410 in accordance with implementations of this disclosure. Index tuning component 410 can determine a maximum length threshold based on the set of LSH bands in the lookup index. For example, index tuning component 410 can assess at what length the maximum length threshold maximizes retention of discriminate data for a high majority of identified LSH bands.

In one implementation, index tuning component 410 removes a LSH band from the lookup index based on a length of the LSH band, the offset list associated with the LSH band, the band size threshold, and the maximum length threshold. For example, if the length of an LSH band has reached the maximum length threshold and the offset list of the LSH band meets the band size threshold, that LSH band may be removed from the index and not discriminative enough to provide use in matching an unknown audio sample.

In one implementation index tuning component 410 downsamples an LSH band in the lookup index based on a length of the LSH band, the offset list associated with the LSH band, the band size threshold, and the maximum length threshold. For example, if the length of an LSH band has reached the maximum length threshold and the offset of the LSH band meets the band size threshold, that LSH band may be downsampled, e.g., some of the items from the offset list can be removed.

FIGS. 5-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 5:
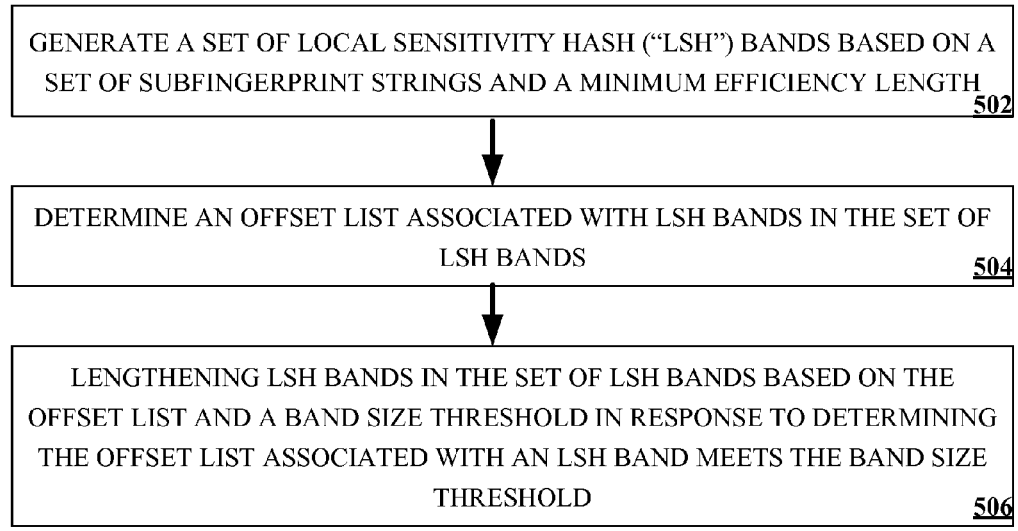
FIG. 5 illustrates an example method for generating a variable length LSH index in accordance with implementations of this disclosure.

FIG. 5 illustrates an example method for generating a variable length LSH index in accordance with implementations of this disclosure. At 502, a set of LSH bands can be generated (e.g., by LSH band component 210) based on a set of subfingerprint strings and a minimum efficiency length. It can be appreciated the length of LSH bands in the set of generated LSH bands are at least the length of the minimum efficiency length. In one implementation, generating LSH bands among the set of LSH bands is based on concatenating bytes from a subfingerprint string among the set of fingerprint strings. In one implementation, the concatenated bytes are consecutive bytes from the subfingerprint string. In another implementation, the concatenated bytes comprise a first byte and a set of following bytes wherein a following byte in the set of following bytes is based off a randomizing hash of the first byte and preceding following bytes in the set of following bytes.

At 504, an offset list associated with LSH bands in the set of LSH bands can be determined (e.g., by offset component 220). At 506, LSH bands in the set of LSH bands can be lengthened (e.g., by splitting component 230) based on the offset list and a band size threshold in response to determining the offset list associated with an LSH band meets the band size threshold. In one implementation, the LSH band is lengthened by an additional byte that is a next consecutive byte from the subfingerprint string. In another implementation, the additional byte is a based off the randomizing hash of the LSH band.

Figure 6:
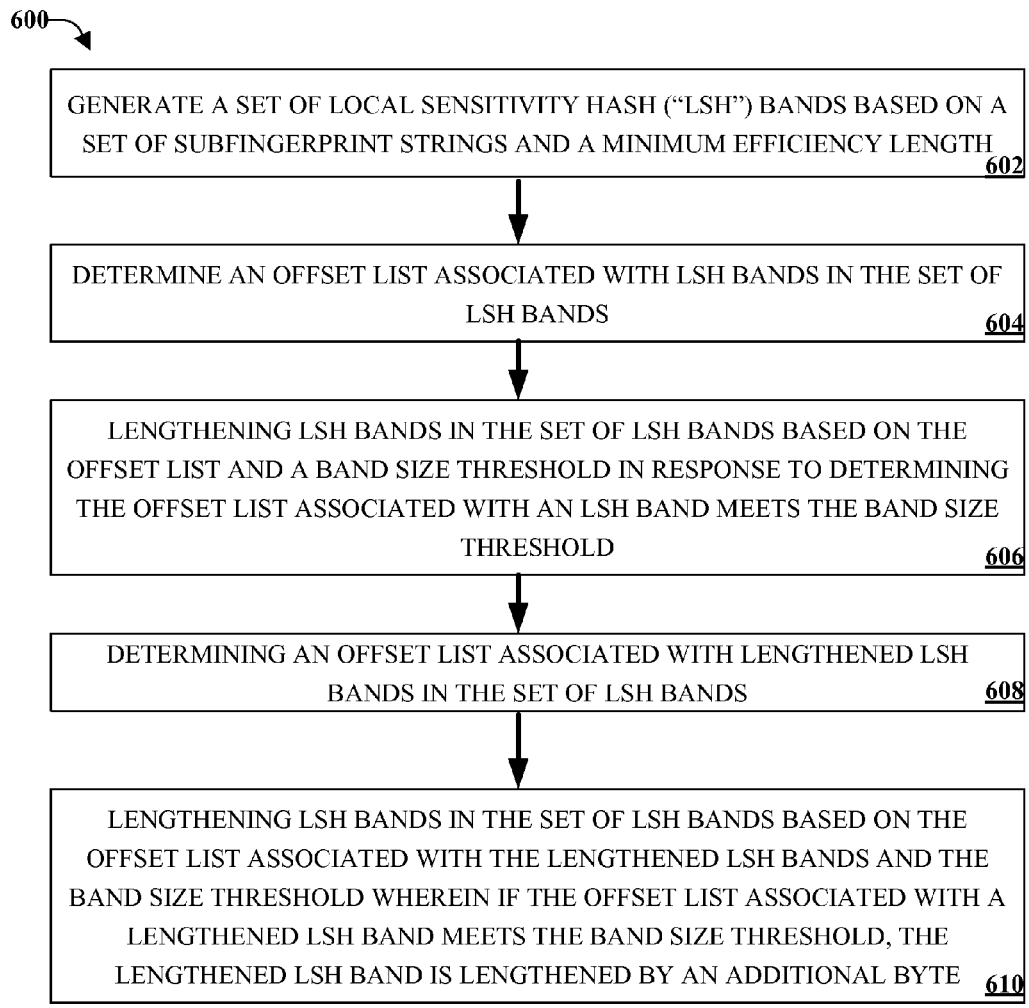
FIG. 6 illustrates an example method for generating a variable length LSH index including lengthening lengthened LSH bands in accordance with implementations of this disclosure.

FIG. 6 illustrates an example method for generating a variable length LSH index including lengthening lengthened LSH bands in accordance with implementations of this disclosure. At 602, a set of LSH bands can be generated (e.g., by LSH band component 210) based on a set of subfingerprint strings and a minimum efficiency length. At 604, an offset list associated with LSH bands in the set of LSH bands can be determined (e.g., by offset component 220). At 606, LSH bands in the set of LSH bands can be lengthened (e.g., by splitting component 230) based on the offset list and a band size threshold in response to determining the offset list associated with an LSH band meets the band size threshold.

At 608, an offset list associated with lengthened LSH bands in the set of LSH bands can be determined (e.g., by offset component 220). At 610, LSH bands in the set of LSH bands can be further lengthened (e.g., by splitting component 230) based on the offset list associated with the lengthened LSH bands and the band size threshold wherein if the offset list associated with a lengthened LSH band meets the band size threshold, the lengthened LSH band is lengthened by an additional byte.

Figure 7:
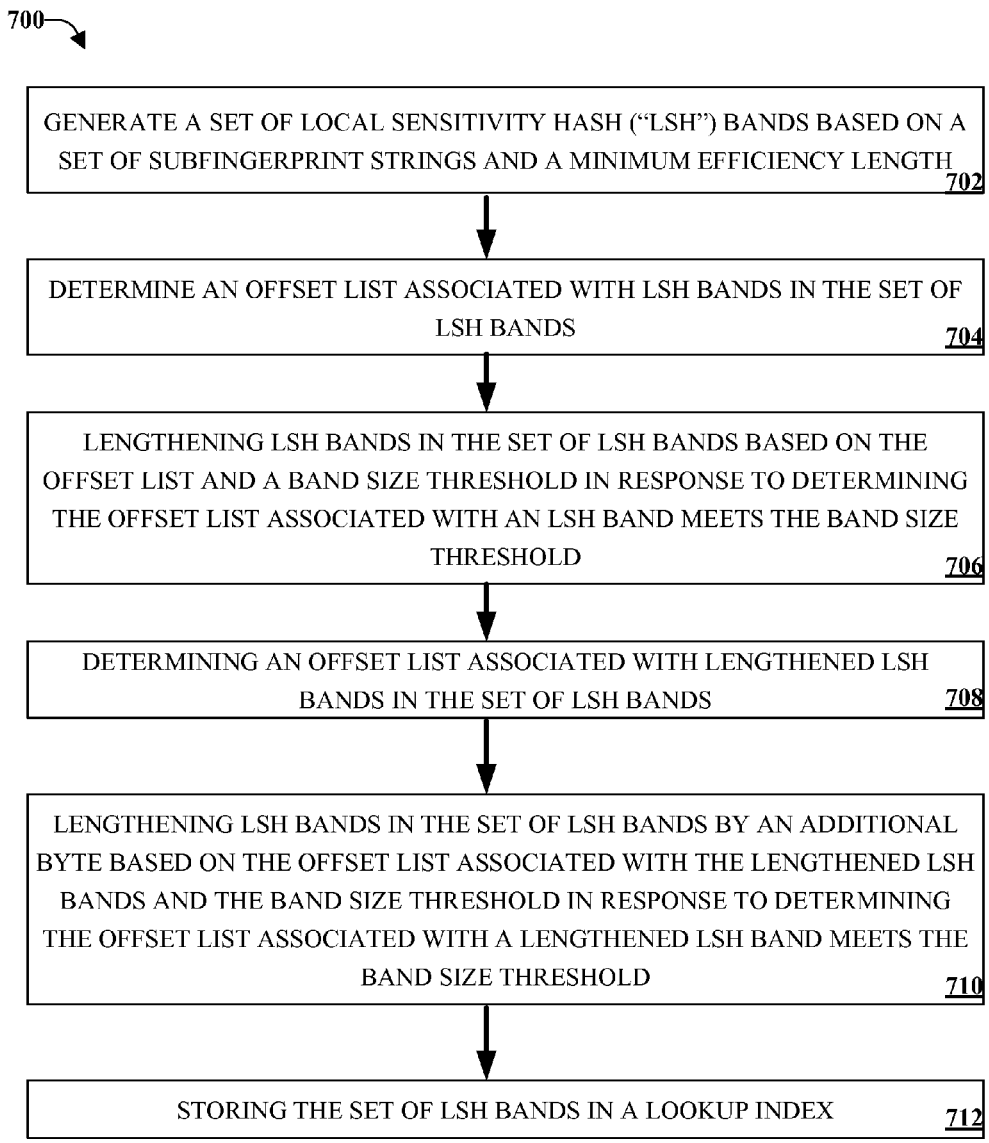
FIG. 7 illustrates an example method for generating a variable length LSH index including storing LSH bands in a lookup index in accordance with implementations of this disclosure.

FIG. 7 illustrates an example method for generating a variable length LSH index including storing LSH bands in a lookup index in accordance with implementations of this disclosure. At 702, a set of LSH bands can be generated (e.g., by LSH band component 210) based on a set of subfingerprint strings and a minimum efficiency length. At 704, an offset list associated with LSH bands in the set of LSH bands can be determined (e.g., by offset component 220). At 706, LSH bands in the set of LSH bands can be lengthened (e.g., by splitting component 230) based on the offset list and a band size threshold in response to determining the offset list associated with an LSH band meets the band size threshold. At 708, an offset list associated with lengthened LSH bands in the set of LSH bands can be determined (e.g., by offset component 220). At 710, lengthened LSH bands in the set of LSH bands can be further lengthened (e.g., by splitting component 230) by an additional byte based on the offset list associated with the lengthened LSH bands and the band size threshold in response to determining the offset list associated with a lengthened LSH band meets the band size threshold. At 712, the set of LSH bands can be stored in a lookup index.

Figure 8:
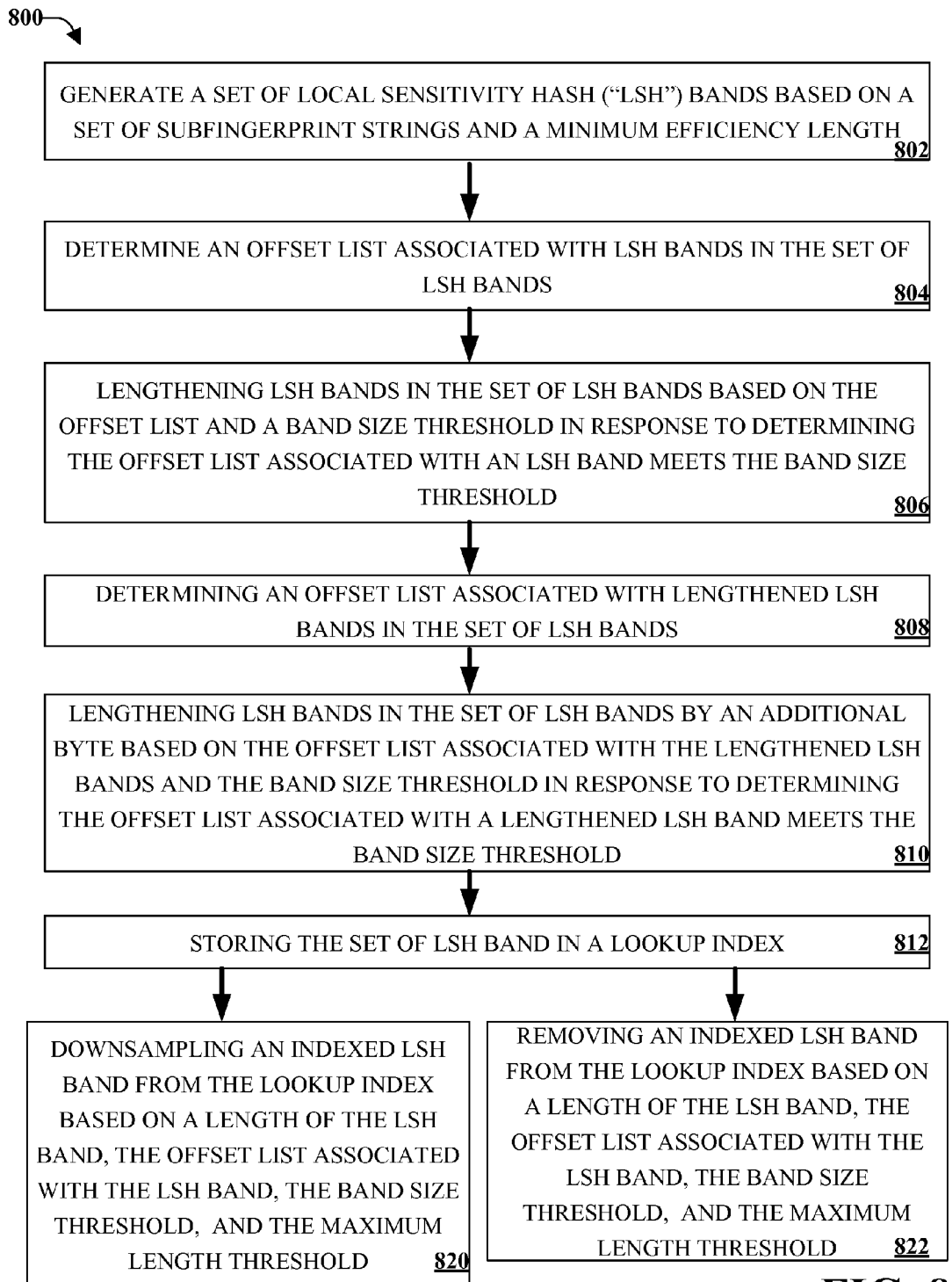
FIG. 8 illustrates an example method for generating a variable length LSH index including tuning a lookup index in accordance with implementations of this disclosure.

FIG. 8 illustrates an example method for generating a variable length LSH index including tuning a lookup index in accordance with implementations of this disclosure. At 802, a set of LSH bands can be generated (e.g., by LSH band component 210) based on a set of subfingerprint strings and a minimum efficiency length. At 804, an offset list associated with LSH bands in the set of LSH bands can be determined (e.g., by offset component 220). At 806, LSH bands in the set of LSH bands can be lengthened (e.g., by splitting component 230) based on the offset list and a band size threshold in response to determining the offset list associated with an LSH band meets the band size threshold. At 808, an offset list associated with lengthened LSH bands in the set of LSH bands can be determined (e.g., by offset component 220). At 810, lengthened LSH bands in the set of LSH bands can be further lengthened (e.g., by splitting component 230) by an additional byte based on the offset list associated with the lengthened LSH bands and the band size threshold in response to determining the offset list associated with a lengthened LSH band meets the band size threshold.

At 812, the set of LSH bands can be stored in a lookup index. At 820, an indexed LSH band in the lookup index can be down-sampled (e.g., by index tuning component 410) based on a length of the LSH band, the offset list associated with the LSH band, the band size threshold, and the maximum length threshold. Alternatively, at 822, an indexed LSH band can be removed (e.g., by index tuning component 410) from the lookup index based on a length of the LSH band, the offset list associated with the LSH band, the band size threshold, and the maximum length threshold.

Figure 9:
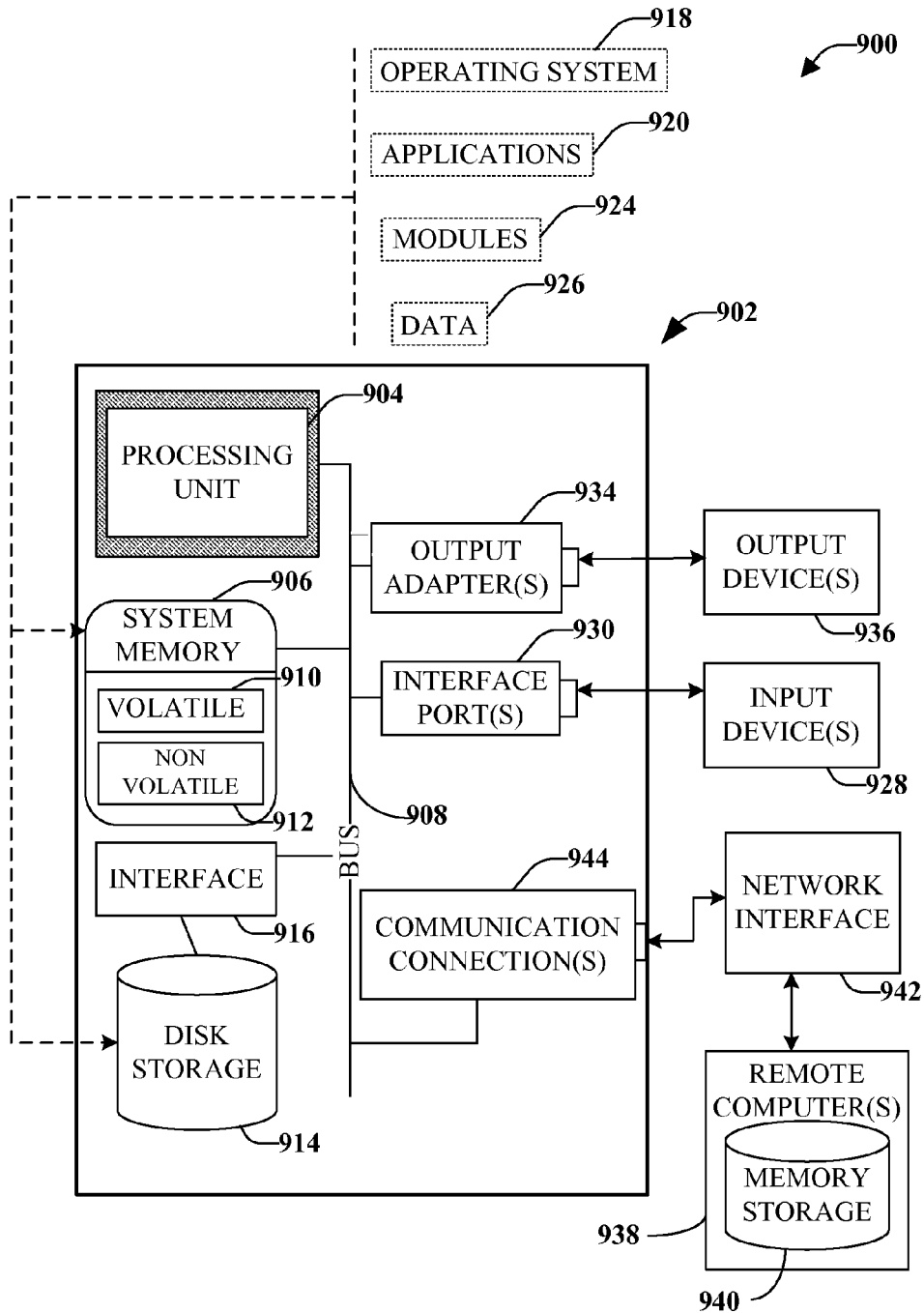
FIG. 9 illustrates an example block diagram of a computer operable to execute the disclosed architecture in accordance with implementations of this disclosure.

With reference to FIG. 9, a suitable environment 900 for implementing various aspects of the claimed subject matter includes a computer 802. It is to be appreciated that the computer, 902 can be used in connection with implementing one or more of the systems or components shown and described in connection with FIGS. 1-4. The computer 902 includes a processing unit 904, a system memory 906, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
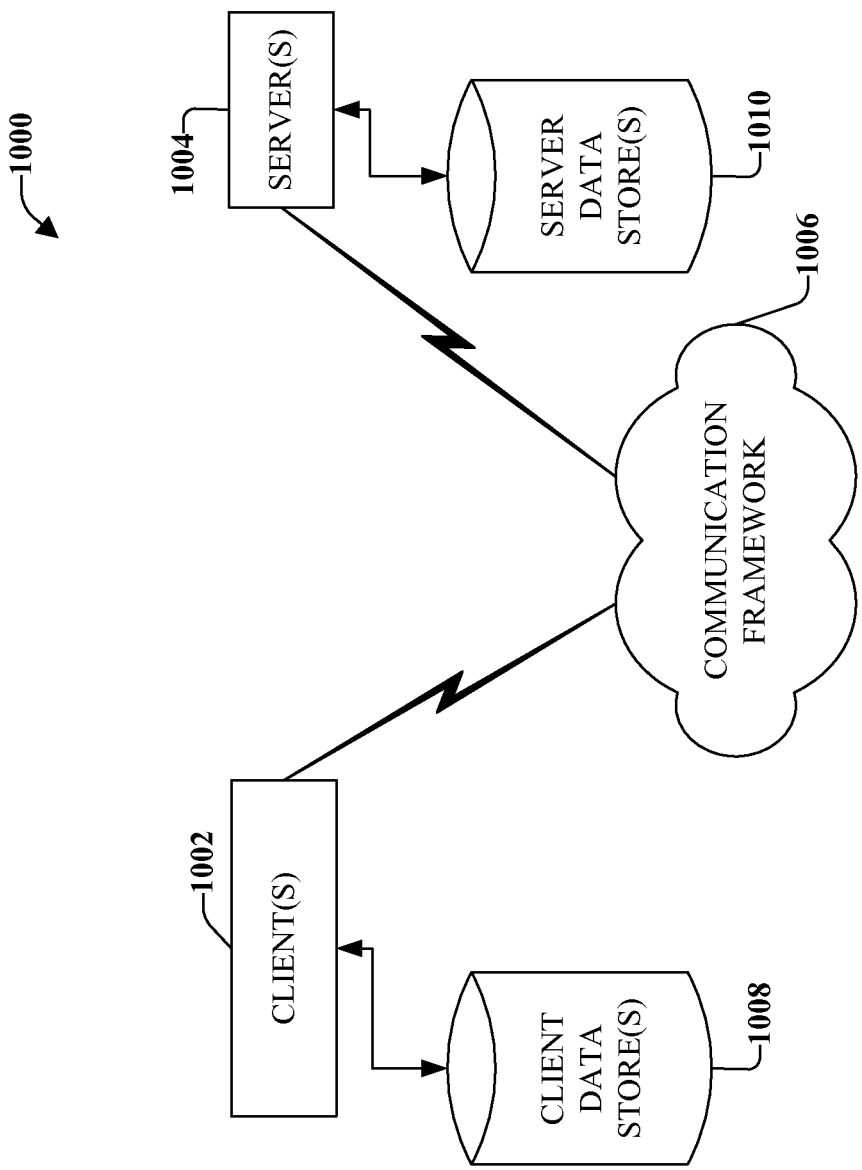
FIG. 10 illustrates an example schematic block diagram for a computing environment in accordance with implementations of this disclosure.

Referring now to FIG. 10, there is illustrated a schematic block diagram of a computing environment 1000 in accordance with the subject specification. The system 1000 includes one or more client(s) 1002, which can include an application or a system that accesses a service on the server 1004. The client(s) 1002 can be hardware and/or software (e.g., threads, processes, computing devices). The client(s) 1002 can house cookie(s), metadata, and/or associated contextual information and can also house threads to perform, for example, generating sets of LSH bands, determining offset lists, lengthening LSH bands, storing LSH bands in a lookup index, etc. in accordance with the subject disclosure.

The system 1000 also includes one or more server(s) 1004. The server(s) 1004 can also be hardware or hardware in combination with software (e.g., threads, processes, computing devices). The servers 1004 can house threads to perform, for example, generating sets of LSH bands, determining offset lists, lengthening LSH bands, storing LSH bands in a lookup index, etc. in accordance with the subject disclosure. One possible communication between a client 1002 and a server 1004 can be in the form of a data packet adapted to be transmitted between two or more computer processes where the data packet contains, for example, an audio sample, fingerprints, or LSH bands associated with an audio sample. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   generating, by a system including a processor, a set of local sensitivity hash (LSH) bands based on a set of subfingerprint strings of a fingerprint, wherein respective lengths of LSH bands in the set of LSH bands meet a minimum efficiency length;
   determining, by the system, respective offset lists associated with the LSH bands in the set of LSH bands; and
   increasing, by the system, the respective lengths of LSH bands in the set of LSH bands that have associated offset lists with respective sizes determined to meet a band size threshold.

2. The method of claim 1, wherein generating a LSH band of the set of LSH bands is based on concatenating bytes from a subfingerprint string among the set of subfingerprint strings.

3. The method of claim 2, wherein the concatenated bytes are consecutive bytes from the subfingerprint string.

4. The method of claim 3, wherein increasing the length of the LSH band comprises concatenating a next consecutive byte from the subfingerprint string to the concatenated bytes.

5. The method of claim 2, wherein the concatenated bytes comprise a first byte and a set of random bytes wherein each random byte in the set of random bytes is based off a randomizing hash of the first byte and preceding random bytes in the set of random bytes.

6. The method of claim 5, wherein increasing the length of the LSH band comprises concatenating an additional random byte to the set of random bytes, wherein the additional random byte is based off the randomizing hash of the LSH band.

7. The method of claim 1, further comprising:
   determining, by the system, respective offset lists associated with lengthened LSH bands in the set of LSH bands; and
   increasing, by the system, the respective lengths of lengthened LSH bands in the set of LSH bands that have associated offset lists with respective sizes determined to meet the band size threshold.

8. The method of claim 1, further comprising storing the set of LSH bands in a lookup index.

9. The method of claim 8, further comprising:
   in response to a length of an LSH band meeting a maximum length threshold and an offset list associated with the LSH band meeting the band size threshold, removing the LSH band from the lookup index.

10. The method of claim 8, further comprising:
    in response to a length of an LSH band meeting a maximum length threshold and an offset list associated with the LSH band meeting the band size threshold, down-sampling the LSH band in the lookup index.

11. A system comprising:
    a processor; and
    a memory communicatively coupled to the processor, the memory having stored therein computer-executable instructions, comprising:
      an LSH band component configured to generate a set of local sensitivity hash (LSH) bands based on a set of subfingerprint strings of a fingerprint, wherein respective lengths of LSH bands in the set of LSH bands meet a minimum efficiency length;
      an offset component configured to determine respective offset lists associated with the LSH bands in the set of LSH bands; and
      a splitting component configured to increase respective lengths of LSH bands in the set of LSH bands that have associated offset lists with respective sizes determined to meet a band size threshold.

12. The system of claim 11, wherein the LSH band component generates a LSH band of the set of LSH bands based on concatenating bytes from a subfingerprint string among the set of subfingerprint strings.

13. The system of claim 12, wherein the concatenated bytes are consecutive bytes from the subfingerprint string.

14. The system of claim 13, wherein the splitting component is further configured to increase the length of the LSH band by concatenation of a next consecutive byte from the subfingerprint string to the concatenated bytes.

15. The system of claim 12, wherein the concatenated bytes comprise a first byte and a set of random bytes wherein each random byte in the set of random bytes is based off a randomizing hash of the first byte and preceding random bytes in the set of random bytes.

16. The system of claim 15, wherein the splitting component is further configured to increase the length of the LSH band by concatenation of an additional random byte to the set of random bytes, wherein the additional random byte is based on the randomizing hash of the LSH band.

17. The system of claim 11, further comprising:
    wherein the offset component is further configured to determine respective offset lists associated with lengthened LSH bands in the set of LSH bands; and
    wherein the splitting component is further configured to increase respective lengths of lengthened LSH bands in the set of LSH bands that have associated offset lists with respective sizes determined to meet the band size threshold.

18. The system of claim 11, further comprising:
an index component configured to store the set of LSH bands in a lookup index.

19. The system of claim 18, further comprising an index tuning component configured to remove a LSH band from the lookup index in response to a length of the LSH band meeting a maximum length threshold and an offset list associated with the LSH band meeting the band size threshold.

20. The system of claim 18, further comprising an index tuning component configured to down-sample a LSH band in the lookup index in response to a length of the LSH band meeting a maximum length threshold and an offset list associated with the LSH band meeting the band size threshold.

21. A non-transitory computer-readable medium having instructions stored thereon that, in response to execution, cause a system including a processor to perform operations comprising:
generating a set of local sensitivity hash (LSH) bands based on a set of subfingerprint strings of a fingerprint, wherein respective lengths of LSH bands in the set of LSH bands meet a minimum efficiency length;
determining respective offset lists associated with the LSH bands in the set of LSH bands; and
increasing, by the system, the respective lengths of LSH bands in the set of LSH bands that have associated offset lists with respective sizes determined to meet a band size threshold.

* * * * *